(12) United States Patent
Lancioni et al.

(10) Patent No.: US 10,652,218 B2
(45) Date of Patent: May 12, 2020

(54) MESSAGE PROTECTION

(71) Applicant: McAfee, LLC, Santa Clara, CA (US)

(72) Inventors: German Lancioni, Cordoba (AR); Carl D. Woodward, Santa Clara, CA (US); Mario Leandro Bertogna, San Jose, CA (US)

(73) Assignee: McAfee, LLC, Santa Clara, CA (US)

( * ) Notice: Subject to any disclaimer, the term of this patent is extended or adjusted under 35 U.S.C. 154(b) by 125 days.

(21) Appl. No.: 15/392,003

(22) Filed: Dec. 28, 2016

(65) Prior Publication Data

US 2018/0063091 A1    Mar. 1, 2018

Related U.S. Application Data

(60) Provisional application No. 62/382,015, filed on Aug. 31, 2016.

(51) Int. Cl.

| | |
|---|---|
| H04L 29/06 | (2006.01) |
| H04W 12/10 | (2009.01) |
| H04N 1/32 | (2006.01) |
| H04L 12/58 | (2006.01) |
| H04W 12/02 | (2009.01) |
| G06F 21/62 | (2013.01) |

(52) U.S. Cl.
CPC .......... *H04L 63/0428* (2013.01); *H04L 51/12* (2013.01); *H04L 63/20* (2013.01); *H04L 63/205* (2013.01); *H04N 1/32144* (2013.01); *H04W 12/02* (2013.01); *H04W 12/10* (2013.01); *G06F 21/6245* (2013.01); *H04N 2201/3233* (2013.01)

(58) Field of Classification Search
CPC . G06F 21/6245; H04L 63/0428; H04L 63/20; H04L 63/205; H04L 51/12; H04N 1/32144; H04N 2201/3233; H04W 12/02; H04W 12/10; H04W 4/14; H04W 1/72519; H04W 12/04

USPC ............................................. 726/1; 382/100
See application file for complete search history.

(56) References Cited

U.S. PATENT DOCUMENTS

| | | | |
|---|---|---|---|
| 6,611,607 B1 * | 8/2003 | Davis ..................... | G06F 21/10 |
| | | | 382/100 |
| 9,473,945 B1 * | 10/2016 | Marquardt ............ | H04W 12/10 |
| 9,589,147 B2 * | 3/2017 | Hanner, Sr. ......... | H04L 63/0245 |

(Continued)

FOREIGN PATENT DOCUMENTS

| | | |
|---|---|---|
| WO | 2016075707 A1 | 5/2016 |
| WO | 2018045163 A1 | 3/2018 |

OTHER PUBLICATIONS

"A JPEG compression resistant steganography scheme for raster graphics images", TENCON 2007—2007 IEEE Region 10 Conference, Oct. 30-Nov. 2, 2007 (hereinafter CompResisStega) (Year: 2007).*

(Continued)

*Primary Examiner* — Lisa C Lewis
*Assistant Examiner* — Raied A Salman
(74) *Attorney, Agent, or Firm* — Patent Capital Group

(57) ABSTRACT

There is disclosed in an example a computing apparatus, comprising: a network interface; a messaging application to communicate via the network interface; and one or more logic elements comprising a security layer, discrete from the messaging application, to: generate a message; secure the message; and send the message via the messaging application.

18 Claims, 11 Drawing Sheets

(56) References Cited

U.S. PATENT DOCUMENTS

| | | | | |
|---|---|---|---|---|
| 2004/0098589 A1* | 5/2004 | Appenzeller | ......... | H04L 9/3073 713/170 |
| 2004/0179684 A1* | 9/2004 | Appenzeller | ......... | H04L 9/0825 380/44 |
| 2005/0169496 A1* | 8/2005 | Perry | ...................... | G06F 21/10 382/100 |
| 2008/0307515 A1* | 12/2008 | Drokov | .................. | G06Q 20/32 726/7 |
| 2010/0217732 A1* | 8/2010 | Yang | ...................... | G06N 20/00 706/21 |
| 2010/0275021 A1* | 10/2010 | Kristiansen | ........... | H04L 9/0836 713/171 |
| 2014/0171024 A1* | 6/2014 | Huang | ..................... | H04W 4/12 455/411 |
| 2015/0020018 A1* | 1/2015 | Wang | ...................... | G06F 21/83 715/773 |
| 2016/0246970 A1* | 8/2016 | Otero | ................... | G06F 21/6209 |
| 2016/0360402 A1* | 12/2016 | Park | ..................... | H04W 12/02 |
| 2017/0353842 A1* | 12/2017 | Waddell | .................. | H04W 4/14 |
| 2017/0357415 A1* | 12/2017 | Peterson | ................ | G06F 3/0482 |
| 2018/0063091 A1* | 3/2018 | Lancioni | ................ | H04L 51/12 |

OTHER PUBLICATIONS

Aneesh Jain et al. , 2007, "A JPEG compression resistant steganography scheme for raster graphics images", TENCON 2007—2007 IEEE Region 10 Conference, Oct. 30-Nov. 2, 2007, pp. 1-4.*

Wojciech Mazurczyk, Aug. 2014, "Steganography in Modern Smartphones and Mitigation Techniques", https://arxiv.org/pdf/1410.6796.pdf, pp. 1-25.*

Abhishek Joshi, et al., An Efficient Cryptographic Scheme for Text Message Protection Against Brute Force and Cryptanalytic Attacks, 2015, International Conference on Computer, Communication and Convergence (ICCC 2015), pp. 360-366.*

International Search Report and Written Opinion of the ISA issued in PCT/US2017/049604 dated Oct. 18, 2017 (10 pages).

* cited by examiner

MESSAGE PROTECTION

CROSS-REFERENCE TO RELATED APPLICATIONS

This application claims priority to U.S. Provisional Application 62/382,015, titled "Message Protection," filed Aug. 31, 2016, which is incorporated herein by reference.

FIELD OF THE SPECIFICATION

This disclosure relates in general to the field of computer security, and more particularly, though not exclusively to, a system and method for message protection.

BACKGROUND

Instant messaging and other forms of text messaging are becoming increasingly important communication media. Messaging may take place on many different kinds of devices, both secured and unsecured.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
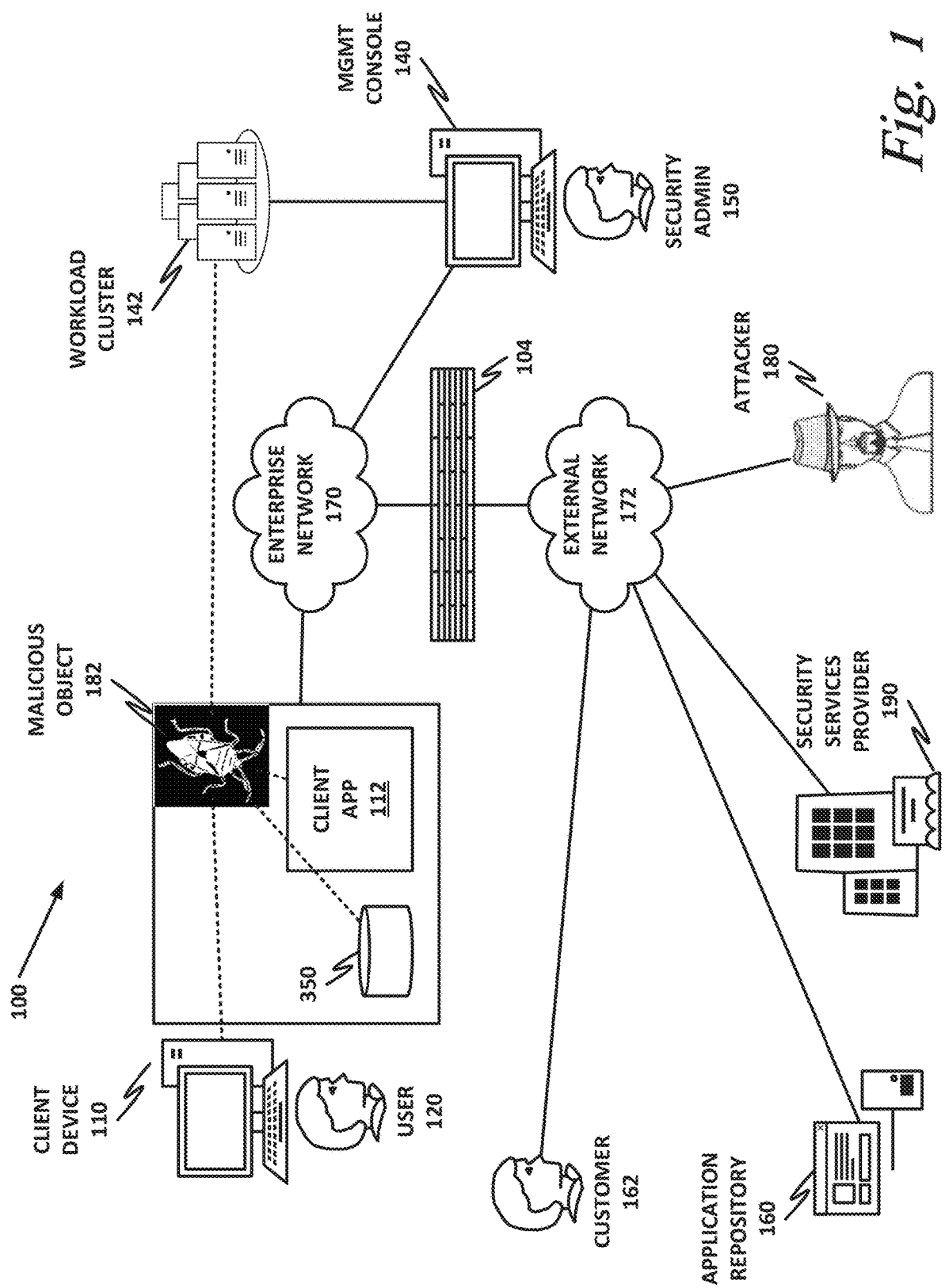
FIG. 1 is a block diagram of a security-enabled network according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

One modern communication medium is "Instant Messaging" (IM), which provides easy and fast communication, especially in the mobile devices domain. IM applications provide many advantages, such as asynchronous messaging, ease of input, and the ability to attach rich content, such as pictures and media files.

However, IM applications also present challenges, particularly with respect to sensitive, private, privileged, confidential, proprietary, classified, personal, or other similar information that is not suitable for sharing widely. Throughout this application, such messages may be referred to generally as "sensitive" messages, and a "sensitive" message should be understood to encompass any of the foregoing, or any message of similar sensitivity. A message may be "sensitive" by virtue of its textual content, or by virtue of attachments to it, such as photographs, documents, or media files.

One difficulty with sensitive messages is that the user lacks control over the message after it is sent, which may compromise privacy and security. For example, a user may wish to send a PIN to a friend who is visiting her home so that he can enter without tripping the alarm. The user may want to ensure that the message cannot be forwarded to other users, and that it does not persist indefinitely on the friend's device. In another case, a user may send a photograph to a friend, but may want to ensure that the friend can access the photograph only so long as the friend remains in her circle of trust. The desire for protection encompasses not only sensitive photographs or personal information, but can also extend to public figures who do not want private data compromised and published, corporations that may need to provide employees access to certain privileged information so long as they remain employees, or governments that want to control distribution of sensitive or classified information.

Such concerns can be addressed in part by special purpose, secure messaging applications. But such special-purpose applications may lack the infrastructure and critical mass of users that make a messaging platform attractive to users. If the user is required to adopt a special, secure messaging platform to effect secure messaging, the more likely result is that security will be compromised in favor of convenience. Thus, it is beneficial to provide a security layer that is capable of interacting with a messaging application and securing a sensitive message, but that does not require a special-purpose secure messaging application or service. In some embodiments, this security layer can be discrete from (i.e., not integrated or tightly coupled with) the messaging application, but can provide security services that sensitive messages within the application.

In an example, a computing device (such as a mobile computing device) includes a "security agent," which broadly encompasses any one or more components of a suite of security services. The security agent may include, for example, an antivirus scanner, antimalware services, an interface to a global security database such as McAfee® Global Threat Intelligence™, as well as a security layer provides a security layer that may include the capability to embed security (such as encryption) and policy into standard data interactions, such as messages sent through a messaging application. The security layer may not only provide initial security (such as by encrypting or otherwise protecting the message), but may also provide the sender further control over the message, such as after-the-fact policy control. This may be accomplished without requiring integration or tight coupling from the IM system provider.

In one illustrative, and non-limiting example, the security layer includes a "smart" keyboard that may be designated as the default input method for the device. The workflow may proceed as follows:

a. The user types a message into the smart keyboard. For example, the message content is: "Upon closing, please wire the funds to bank account 456123789, routing number 654879312." The user wants to provide this information so that funds from a real estate transaction can be deposited in the correct account, but the user does not want the recipient to be able to forward, copy, or otherwise distribute the text, and the user wants the text to be destroyed 48 hours after the transaction closes. This could be a fixed time period (e.g., a date and time certain), or a flexible time period (e.g., 5 minutes after the message is read, or a specified time after a signal indicating a condition precedent).

b. The security layer communicates with a backend server to uniquely identify the sender and the message, and may also negotiate one or more keys and policies. For example, a symmetric key encryption may be used, so that the message cannot be decrypted without a key from the backend server. The policy may specify the date that the message expires (e.g., 48 hours after the transaction closes), a usage policy (e.g., view, no copy, no forward, disable screenshots), and the identity of one or more recipients authorized to retrieve the message.

c. The smart keyboard encrypts the message, including appropriate header information for accessing the backend server, and embeds the encrypted message into a compression-resistant steganographic ".jpg" image. Note that steganography need not be used here as a security mechanism itself, but rather may simply be a convenient way to embed an encrypted text message into a .jpg image.

d. The smart keyboard then attaches the steganographic image as a regular image attachment with the messaging application.

e. When the user hits send, the messaging application (which need not be aware of the security layer or the steganography) sends the image to the recipient via the normal messaging channels.

f. The recipient, which also has a security layer, receives the message, including the attached image. The messaging application stores the steganographic image onto a storage of the recipient device. The security layer detects the stored image, inspects it, and determines that the image has embedded steganographic content.

g. The security layer extracts the encrypted message from the image, and then negotiates with the backend server to receive a symmetric decryption key. The backend server ensures that the requested use is consistent with policy, and sends a decryption key to the security layer. The key may have a "time to live," after which it is revoked or no longer valid or usable.

h. The security layer decrypts the message, and displays it for the user. While displaying the message, the security layer enforces the relevant policies.

i. If and when the message expires (according to policy), the security layer deletes the image and its accompanying encrypted message. Note that in some embodiments, whether or not the message is deleted, it cannot be accessed and viewed without a live key from the backend server. Thus, even if the message does not get deleted according to policy, or if the recipient attempts to "end run" around the system by accessing the storage and copying the message out of band, the content is not viewable or usable without a live key.

It should be noted that the system and method of the present specification may be used in any compatible computing platform, as described in more detail below. By way of concrete illustration, a mobile communication method, such as via smart phones, is used to discuss certain embodiments.

By replacing the native soft keyboard in a smartphone with, for example, an Intel® provided "smart" security aware keyboard, the system allows a user to interact with the IM application via ordinary methods, but still provides security and policy advantages. The user can type a message into any IM application (or any other application), and the security layer, including the security aware keyboard, processes the text before sending it as input to the IM application. Alternatively or in addition, a floating widget or service may be always available as a helper utility while a user operates the IM application. For example, the helper application could cut the text from the input box onto the system copy buffer, paste the message into the security layer, process the message, and then paste the resultant secure message (e.g., encrypted, or as a steganographic image) into the input box. On the receiving end, a helper application may allow the user to select the image and request that it be decrypted.

To further increase security, the user may also have the option to select the image used for steganography, and may opt to tell the recipient out of band, "I am sending you a sensitive message." The sender may then send the sensitive message in the ordinary course of conversation, looking to the casual observer like simply sharing a picture. This makes the system less susceptible to casual third-party attacks, as it will not be obvious that a secure operation has taken place.

On the receiver side, the recipient's device may also have a security layer, including for example a security aware keyboard. When an incoming message is received, the messaging application stores the image to disk. In an embodiment, a file monitoring service scans for the recently created image files in the local disk. The use of images may be advantageous, as some devices may be expected to receive fewer overall image files than text messages, so that it is more reasonable to scan all incoming image files to see if they have embedded steganographic content.

Once a carrier image is detected, reverse steganography is applied to extract the message content, which may still be encrypted. The extraction and/or decryption may be authorized by a backend server, which may supply a key and an accompanying policy for handling the message, as set by the sender when the message was sent. When the recipient opens the image in the IM application, a particular intent (e.g., "view") is launched and managed by the security layer. This triggers a visualizer that shows the hidden message from the dummy image and applies the policy set by the sender (including, for example, destroying the message in a fixed or flexible time period after it is read, restricting certain operations, or otherwise managing the message). Other nonlimiting policy examples include:

a. Deauthorize or delete the message after being read by the receiver.

b. Deauthorize or delete the message after a specific time (e.g., 5 minutes, 1 hour, 24 hours, etc.).

c. Prevent message forwarding (only the original receiver can open it).
d. Monitor message forwarding (know who received the message through forwarding).
e. Message recall (deauthorize or delete the message from all contacts who received it).

Although the foregoing example focuses on mobile devices and IM applications, the concept can be extended to other domains and applications, and also is capable of managing different types of message content such as images, video or audio.

Advantageously, with the system and method of the present specification, a user need not shift to a new IM application or network, which may be inconvenient, or which may lack critical mass. The user can continue using his preferred IM application, which need not provide its own security mechanisms, and which need not integrate with the discrete security layer of the present specification. Furthermore, the user needs not adapt to or learn new patterns and techniques, other than selecting certain messages for protection (unless all messages are to be treated as protected). The user experience may remain essentially seamless.

Further advantageously, the system and method allows the user to manage sent messages, such as with policies that require the message to be destroyed after a fixed or flexible time, restrictions on usage and forwarding, restrictions on device functions while the message is being viewed, or even requiring a new key and specific permission each time the user wishes to view the secure message.

The system and method of the present specification can also assure security and privacy on IM applications/messaging systems that do not implement any kind of security or privacy measures. For example, SMS text messages are unsecure, stored in servers and may be used for fraudulent activities if captured by attackers. With this system, even if the user is on unsecure channels or IM applications, the sensitive messages may be protected from attackers, and can even be recalled or remotely deleted by the sender.

A system and method for message security will now be described with more particular reference to the attached Figures. It should be noted that throughout the Figures, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a secured enterprise 100 according to one or more examples of the present specification. In the example of FIG. 1, secured enterprise 100 may be configured to provide services or data to one or more customers 162, who may access information or services via external network 172. This may require secured enterprise 100 to at least partly expose certain services and networks to the outside world, thus creating a logical security aperture.

Within secured enterprise 100, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful access to enterprise resources.

In certain embodiments, workload cluster 142 may provide a backend server, which may be useful for key and policy management. Additional details of such a server are disclosed in connection with server 300 of FIG. 3.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 112 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "Application Store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

Figure 2:
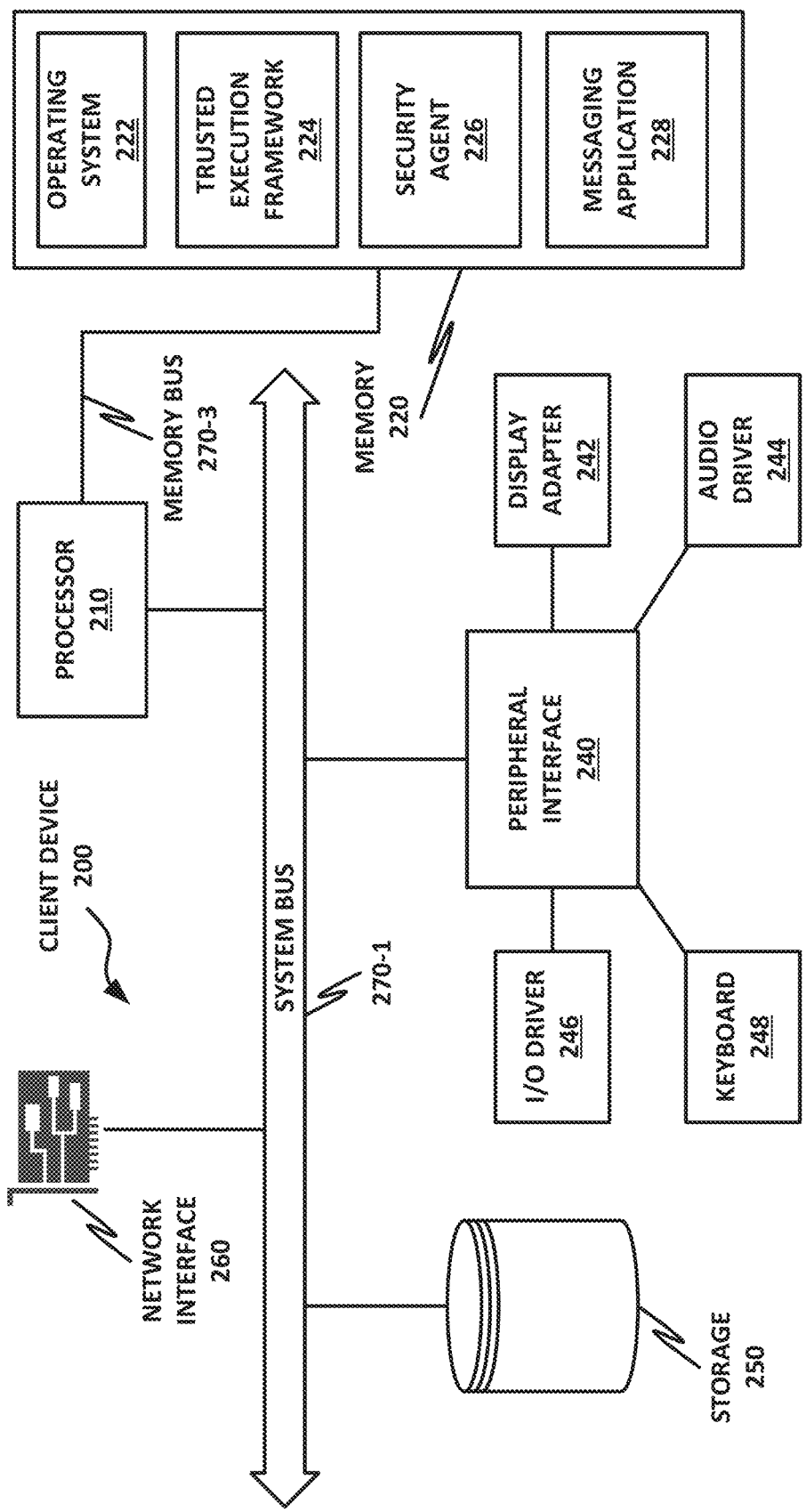
FIG. 2 is a block diagram of a computing device according to one or more examples of the present specification.

FIG. 2 is a block diagram of client device 200 according to one or more examples of the present specification. Client device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may all be examples of client devices 200.

Client device 200 includes a processor 210 connected to a memory 220, having stored therein executable instructions for providing an operating system 222 and at least software portions of a trusted execution framework 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of trusted execution framework 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Trusted execution framework (TEF) 224, in one example, is operable to carry out computer-implemented methods as described in this specification. TEF 224 may include one or more tangible non-transitory computer-readable mediums having stored thereon executable instructions operable to instruct a processor to provide a trusted execution framework 224. As used throughout this specification, an "engine" includes any combination of one or more logic elements, of similar or dissimilar species, operable for and configured to perform one or more methods provided by the engine. Thus, TEF 224 may comprise one or more logic elements configured to provide methods as disclosed in this specification. In some cases, TEF 224 may include a special integrated circuit designed to carry out a method or a part thereof, and may also include software instructions operable to instruct a processor to perform the method. In some cases, TEF 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space" associated with ring 0, 1, or 2 in a protection ring architecture. It should also be noted that TEF 224 may also include other hardware and software, including configuration files, registry entries, and interactive or user-mode software by way of non-limiting example.

In one example, TEF 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of TEF 224 to provide the desired method.

Figure 4:
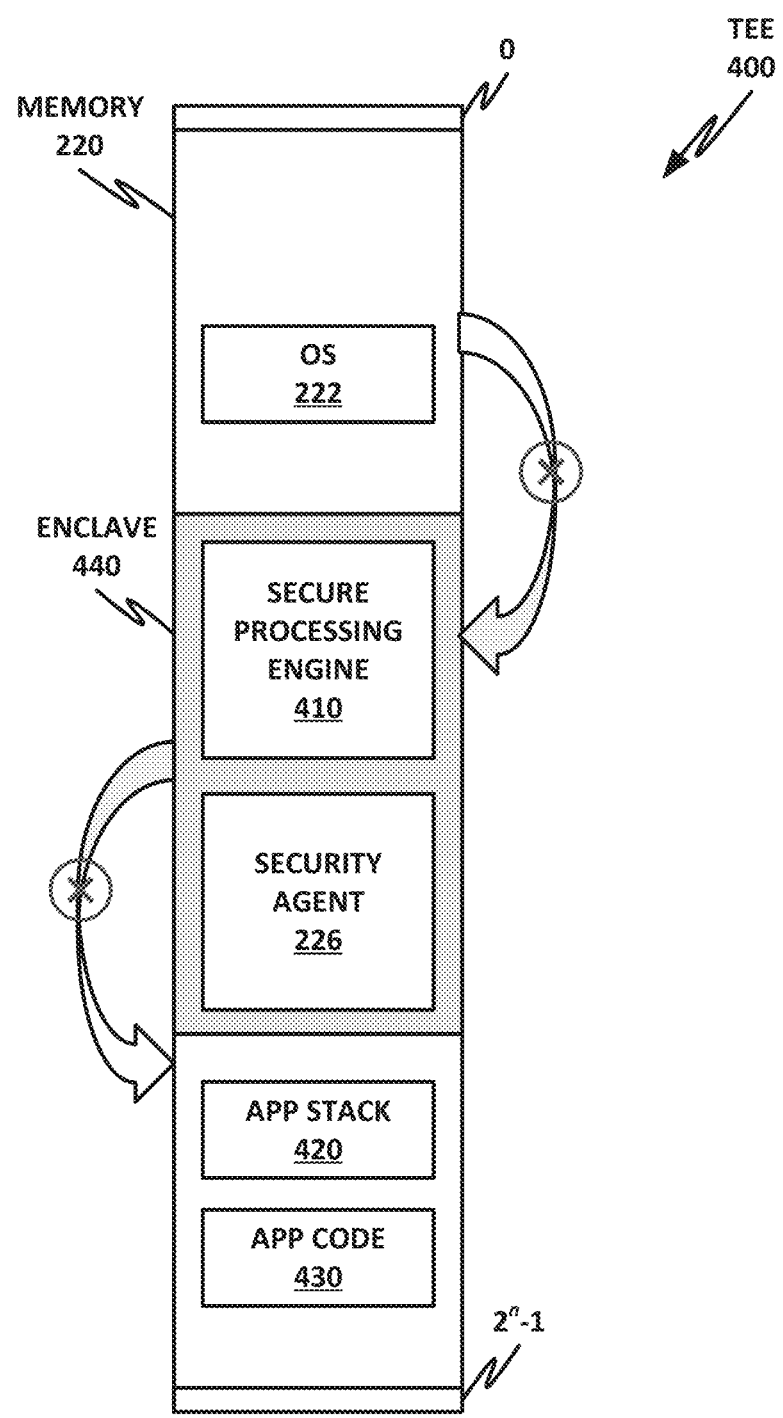
FIG. 4 is a block diagram of a trusted execution environment according to one or more example of the present specification.

Conceptually, TEF 224 may provide an application programming interface (API), and supporting software, that simplifies a programmer's use of TEE 400 (FIG. 4).

Backend server 324 is an engine as described in FIG. 2 and, in one example, includes one or more logic elements operable to carry out computer-implemented methods as described in this specification. Software portions of backend server 324 may run as a daemon process.

Security agent 226 may include one or more non-transitory computer-readable mediums having stored thereon executable instructions operable to instruct a processor to provide security agent 226. At an appropriate time, such as upon booting client device 200 or upon a command from operating system 222 or a user 120 or security administrator 150, processor 210 may retrieve a copy of security agent 226 (or software portions thereof) from storage 250 and load it into memory 220. Processor 210 may then iteratively execute the instructions of security agent 226 to provide the desired method.

There is also shown in this example a messaging application 228, which may be any software the enables inter-device or intra-device communication in which sensitive messages may be sent. A messaging application could include, for example, an SMS interface, Snapchat, WhatsApp, Facebook Messenger, e-mail, or any other service for users communicating with each other. Messaging application 228 may also include inter-device or on-device inter-process communication, in which sensitive messages may be exchanged. Note that security agent 226 may be discrete from (i.e., not tightly coupled or integrated with) messaging application 228, and may include a security-aware soft keyboard, or a popup application or service by way of nonlimiting example.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of nonlimiting example.

There is also disclosed in this example a keyboard 248. In the particular example of a mobile device, keyboard 248 may be a "soft" security-aware keyboard provided via a touchscreen.

Figure 3:
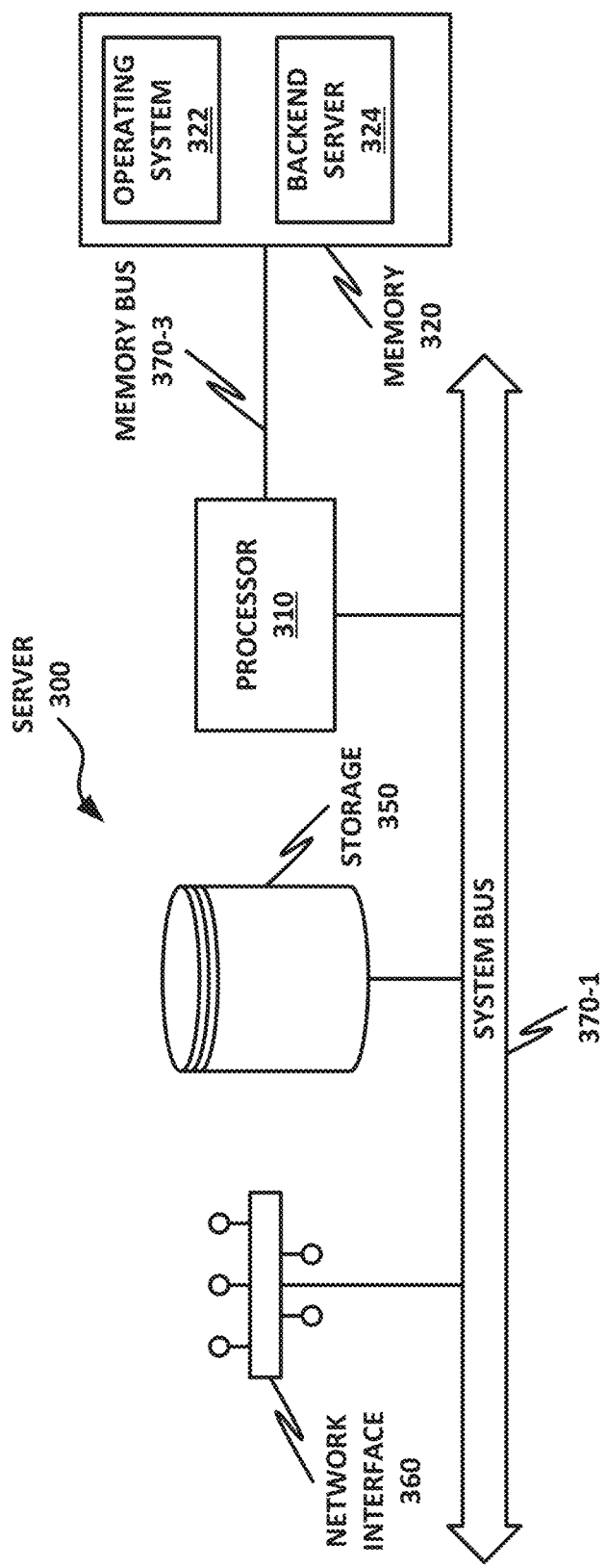
FIG. 3 is a block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a backend server 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of backend server 324.

Network interface 360 may be provided to communicatively couple server 300 to a wired or wireless network, and may include one or more logic elements as described in FIG. 2.

Backend server 324 is an engine as described in FIG. 2 and, in one example, includes one or more logic elements operable to carry out computer-implemented methods as described in this specification. Software portions of backend server 324 may run as a daemon process.

Backend server 324 may include one or more non-transitory computer-readable mediums having stored thereon executable instructions operable to instruct a processor to provide backend server 324. At an appropriate time, such as upon booting server 300 or upon a command from operating system 322 or a user 120 or security administrator 150, processor 310 may retrieve a copy of backend server 324 (or software portions thereof) from storage 350 and load it into memory 320. Processor 310 may then iteratively execute the instructions of backend server 324 to provide the desired method.

Peripheral interface 340 may be configured to interface with any auxiliary device that connects to server 300 but that is not necessarily a part of the core architecture of server 300. Peripherals may include, by way of non-limiting examples, any of the peripherals disclosed in FIG. 2. In some cases, server 300 may include fewer peripherals than client device 200, reflecting that it may be more focused on providing processing services rather than interfacing directly with users.

FIG. 4 is a block diagram of a trusted execution environment (TEE) 400 according to one or more examples of the present specification.

In the example of FIG. 4, memory 220 is addressable by n-bits, ranging in address from 0 to $2^n-1$. Within memory 220 is an OS 222, enclave 440, application stack 420, and application code 430.

In this example, enclave 440 is a specially-designated portion of memory 220 that cannot be entered into or exited from except via special instructions, such as Intel® SGX or similar. Enclave 440 is provided as an example of a secure environment which, in conjunction with a secure processing engine 410, forms a trusted execution environment (TEE) 400 on client device 200. A TEE 400 is a combination of hardware, software, and/or memory allocation that provides the ability to securely execute instructions without interference from outside processes, in a verifiable way. By way of example, TEE 400 may include memory enclave 440 or some other protected memory area, and a secure processing engine 410, which includes hardware, software, and instructions for accessing and operating on enclave 440. Non-limiting examples of solutions that either are or that can provide a TEE include Intel® SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 410 may be a user-mode application that operates via trusted execution framework 224 within enclave 440. TEE 400 may also conceptually include processor instructions that secure processing engine 410 and trusted execution framework 224 require to operate within enclave 440.

Secure processing engine 410 and trusted execution framework 224 may together form a trusted computing base (TCB), which is a set of programs or computational units that are trusted to be secure. Conceptually, it may be advantageous to keep TCB relatively small so that there are fewer attack vectors for malware objects 182 or for negligent software. Thus, for example, operating system 222 may be excluded from TCB, in addition to the regular application stack 420 and application code 430.

In certain systems, computing devices equipped with the Intel® Software Guard Extension (SGX™) or equivalent instructions may be capable of providing an enclave 440. It should be noted however, that many other examples of TEEs are available, and TEE 400 is provided only as one example thereof. Other secure environments may include, by way of nonlimiting example, a virtual machine, sandbox, testbed, test machine, or other similar device or method for providing a TEE 400.

In an example, enclave 440 provides a protected memory area that cannot be accessed or manipulated by ordinary computer instructions. Enclave 440 is described with particular reference to an Intel® SGX™ enclave by way of example, but it is intended that enclave 440 encompass any secure processing area with suitable properties, regardless of whether it is called an "enclave."

One feature of an enclave is that once an enclave region 440 of memory 220 is defined, as illustrated, a program pointer cannot enter or exit enclave 440 without the use of special enclave instructions or directives, such as those provided by Intel® SGX architecture. For example, SGX processors provide the ENCLU[EENTER], ENCLU[ERESUME], and ENCLU[EEXIT]. These are the only instructions that may legitimately enter into or exit from enclave 440.

Thus, once enclave 440 is defined in memory 220, a program executing within enclave 440 may be safely verified to not operate outside of its bounds. This security feature means that secure processing engine 410 is verifiably local to enclave 440. Thus, when an untrusted packet provides its content to be rendered with trusted execution framework 224 of enclave 440, the result of the rendering is verified as secure.

Enclave 440 may also digitally sign its output, which provides a verifiable means of ensuring that content has not been tampered with or modified since being rendered by secure processing engine 410. A digital signature provided by enclave 440 is unique to enclave 440 and is unique to the hardware of the device hosting enclave 440.

In certain embodiments, TEE 400 may support the security layer of security agent 226 as described herein. For example, TEE 400 can provide symmetric encryption service, attestation and verification, and secure memory that cannot be tampered with by other processes. Thus, for example, a security-aware keyboard could be provided within TEE 400, and could perform steganography and encryption within TEE 400. Data are then exposed outside of TEE 400 only once they have been encrypted and embedded in a dummy image.

Figure 5:
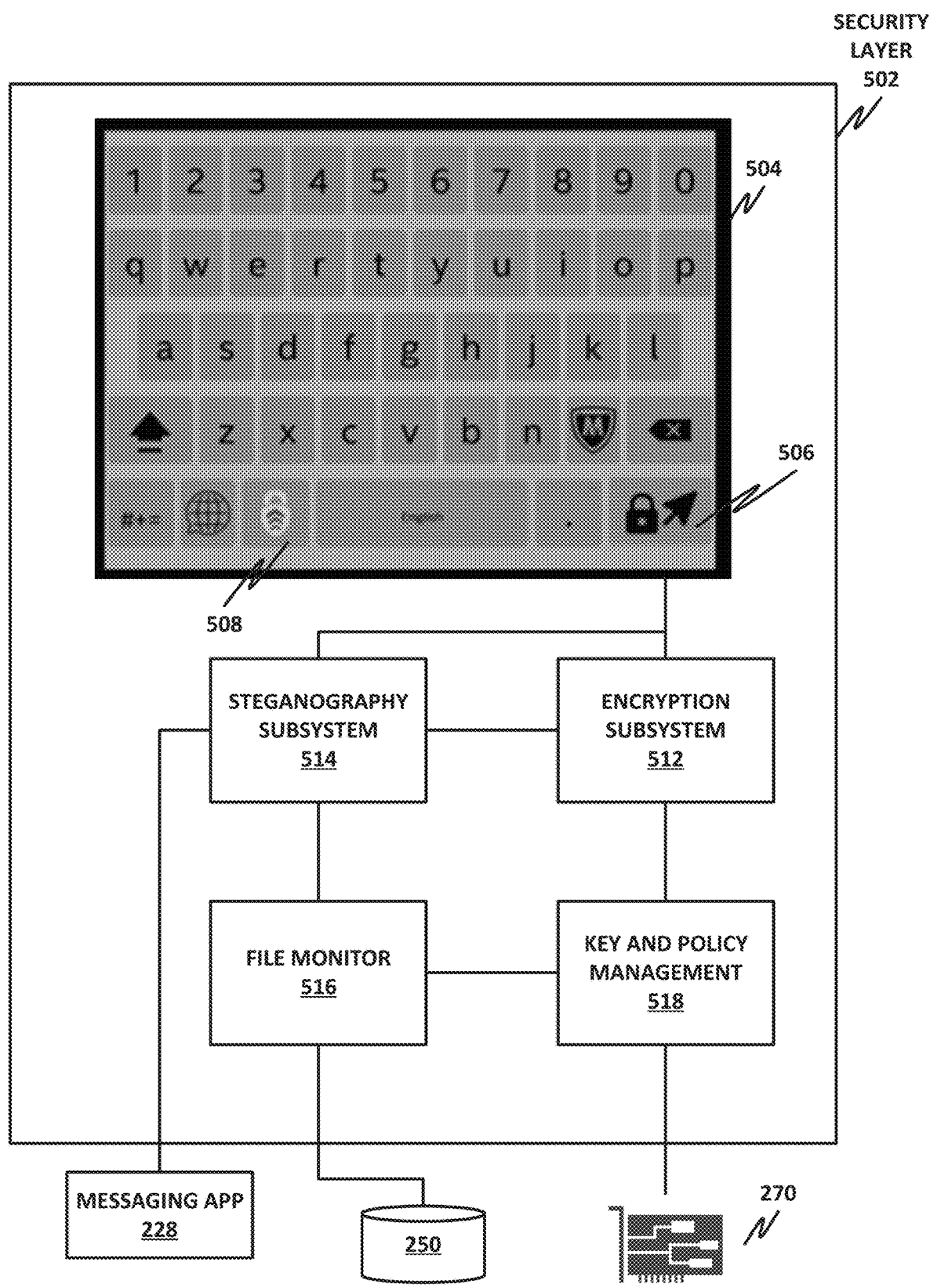
FIG. 5 is an illustration of "soft" keyboards according to one or more examples of the present specification.

FIG. 5 illustrates selected aspects of the present specification, including aspects of a security layer 502, which may be provided as part of security agent 226, along with other runtime support and auxiliary services.

As illustrated in FIG. 5, an example of security layer 502 includes a security aware keyboard 504, a steganography subsystem 514, an encryption subsystem 512, a key and policy management block 518, and a file monitor 516. These are provided by way of illustrative and nonlimiting example. Other embodiments of a security layer 502 may provide other components, and some embodiments of security layer 502 may not include all of the listed components.

Security aware keyboard 504 may be a mobile keyboard that can be installed in any compatible smartphone or tablet. It may replace the native or stock soft keyboard, and provides security and privacy features. For example, a "secure enter" key 506 is provided. The icon on this key illustrates that the input will not be provided directly to the application, but rather will be processed first. A special security soft key 508 may also be provided. This key could be used, for example, similar to a "shift" key, and operates on the enter key. When the key is not activated, the input is provided directly to the application. When it is activated, the secure enter function is enabled.

Security aware keyboard 504 may be present for all applications if it is set as the default input method. Security layer 502 may integrate seamlessly with external applications, such as messaging application 228, while still being discrete from those applications. Because security aware keyboard 504 can plug in to messaging application 228 via standard APIs, no special integration is required.

Encryption subsystem 512 is provided for encrypting and decrypting message content. This can be useful, for example, when messaging application 228 does not natively support channel encryption. In some embodiments, encryption subsystem 512 is provided within or cooperates with TEE 400.

Steganography subsystem 514 embeds encrypted message content into a conveyor element, such as an image or other media file (e.g., a video, an audio file, or a file in a binary or proprietary file format). The conveyor element is a "dummy" that can be transmitted via messaging application 228 over normal channels. For example, most messaging applications support rich content, such as photographs and/or multimedia files.

In some embodiments, the steganography algorithm is compression-resistant, so that the message integrity is preserved even if the IM application compresses images during transmission. Note that the steganography need not be a security measure itself, but rather may simply be a carrier mechanism that is compatible with contemporary IM applications.

File monitor 516 is a smart file monitoring service. File monitor 516 detects when IM application 228 receives a new incoming message (e.g., when messaging application 228 saves the incoming image file to somewhere in storage 250. Note that this need not include saving the image to a user-accessible "gallery." The image file could be saved to an internal database or file storage maintained by messaging application 228.

Detection of a new image file may be the trigger for processing the message outside the boundaries of messaging application 228, by executing the reverse steganography and decrypting the message. This is achievable because images received through IM applications may be publicly available in user-accessible locations. Because processing can begin "offline" as soon as the image file is detected, the user experiences less delay when trying to access the message. Note that the decrypted content may be maintained, in some embodiments, within TEE 400, and only displayed to the user via a secure display channel.

Key and policy management block 518 may communicate with a backend server (e.g., server 300) via network interface 270. Key and policy management 518 may provide a user interface (e.g., a popup application or utility) that allows a user to add, remove, revoke, and manage keys associated with a sensitive message. The interface may also allow the user to craft a policy, such as restrictions on operations (e.g., forwarding) or device functions (e.g., screen capture) while displaying the message, and an expiry, by way of nonlimiting example.

Figure 6A:
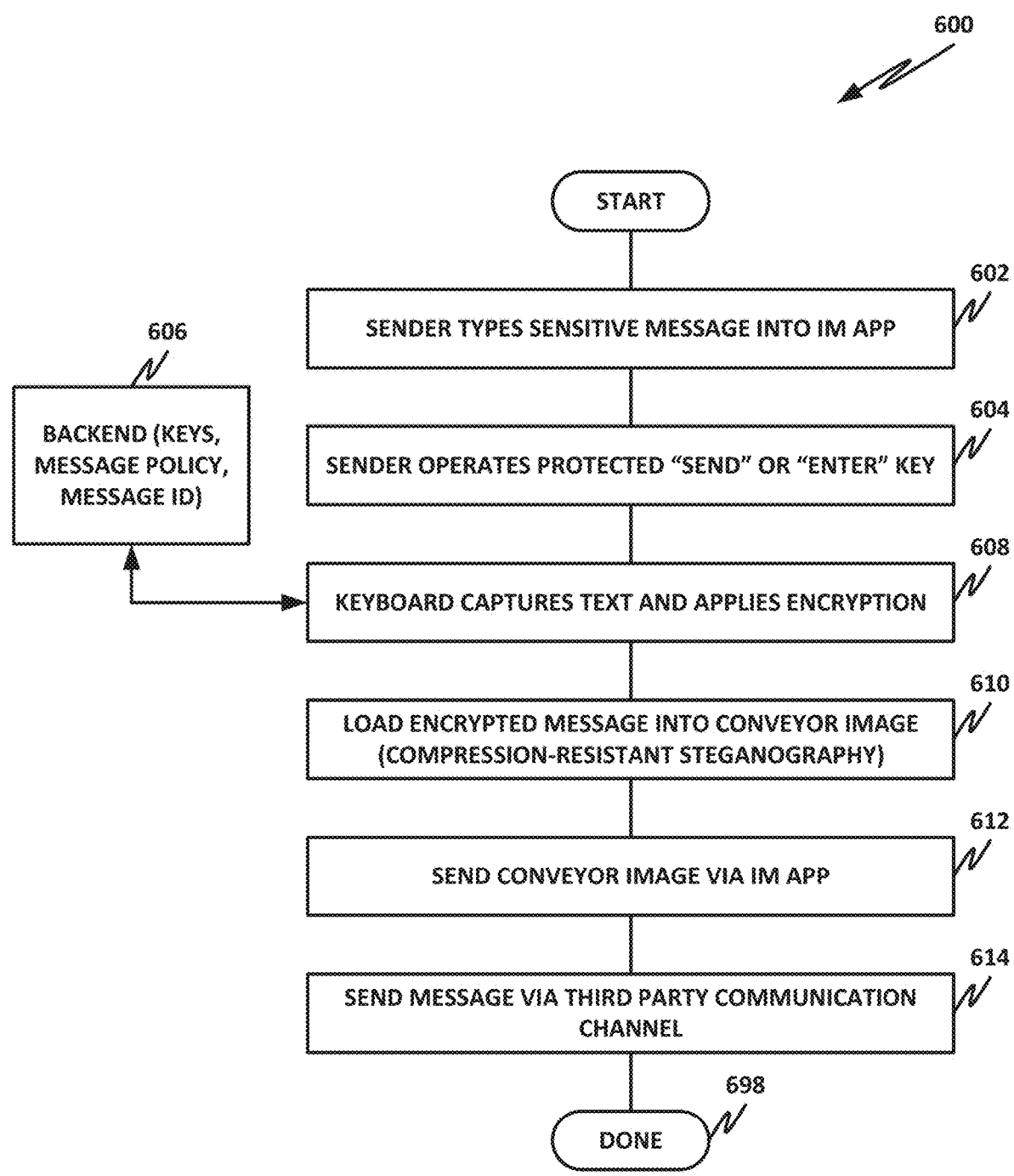
FIGS. 6a and 6b are flow charts of sender-side and receiver-side methods according to one or more examples of the present specification.
Figure 6B:
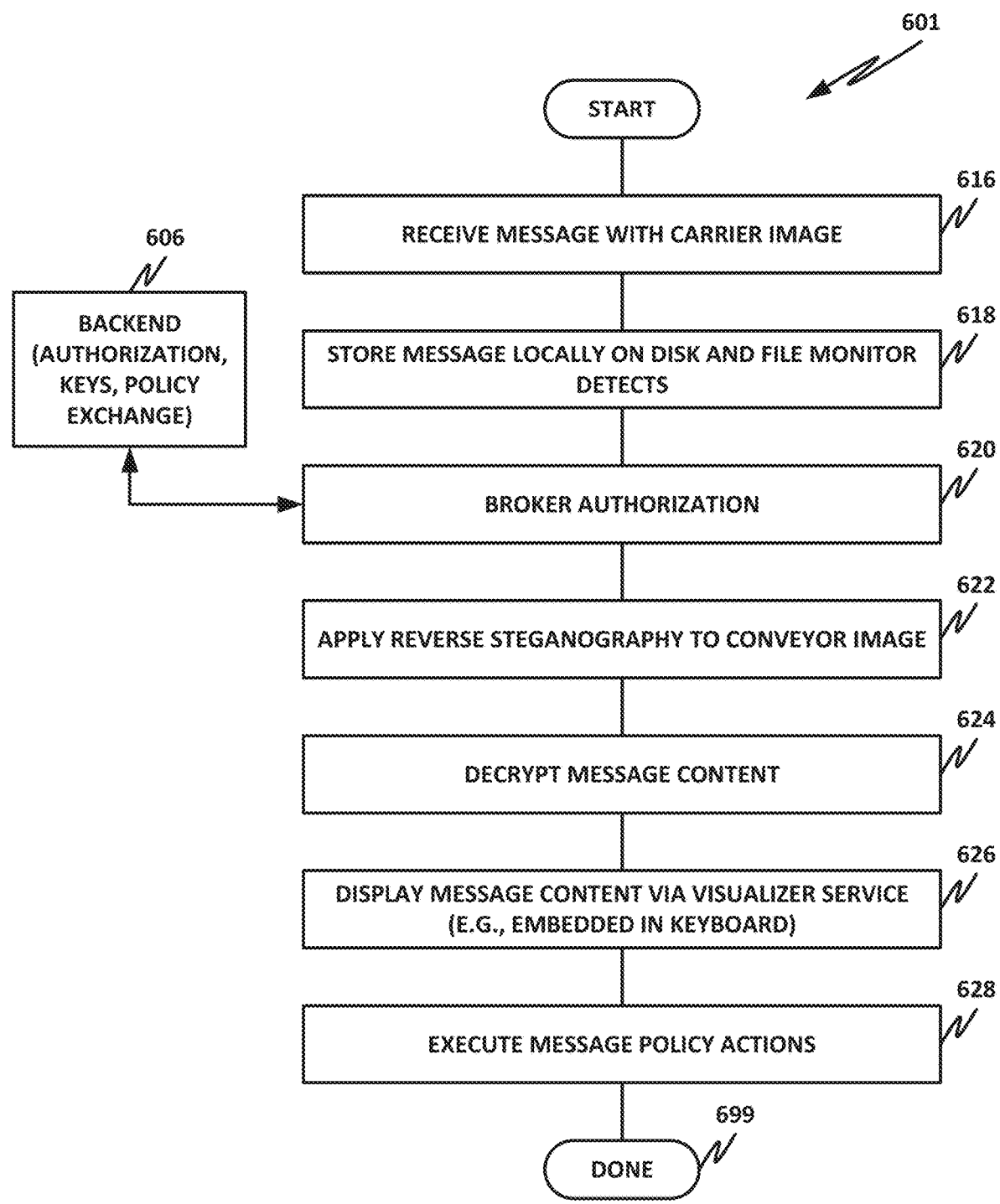

FIGS. 6a and 6b are flow charts of a sender method 600 and receiver method 601 respectively, according to one or more examples of the present specification.

Turning to method 600, at block 602, the sender types a sensitive message into IM application 228. This may include the sender operating security aware keyboard 504 to input the text, thus allowing security layer 502 to appropriately process the text.

In block 604, the user operates the protected "send" or "enter" key, as illustrated in FIG. 5. For example, security-aware keyboard 504 includes a secure enter key 506. This enter key may optionally be activated by a security key 508, indicating the user's intent to protect the instant message. When it is activated, security aware keyboard 504 is instructed to secure the sensitive message according to methods disclosed herein.

In block 608, security layer 502 captures the text and applies encryption. Security layer 502 may also negotiate with backend 606 (e.g., hosted on server 300) to designate and negotiate keys, specify a message policy, and attach a message ID by way of nonlimiting example. This allows backend server 300 to manage the keys, security, and policy to ensure that the message is not misused.

In block 610, security layer 502 loads the encrypted message into a carrier image, such as by using compression resistant steganography. The carrier image may be a simple dummy image, or it may be a user-selected image that appears to be a normal image exchanged in the course of an ordinary conversation. In some examples, this option is configurable. The user may elect to use automated dummy images, or the user may elect to choose an image. Dummy images may be selected from a prebuilt gallery of dummy images, or they may be automatically generated, such as via fractals.

In block 612, security layer 502 adds the steganographic image as an attachment to an IM message and conveys it to messaging at 228.

In block 614, messaging application 228 sends the message via third-party communication channels to the recipient. The message includes the steganographic image with the embedded encrypted message.

In block 698, the method is done.

Turning to method 601, the method may be performed by a receiver device according to one or more examples of the present specification.

In block 616, the receiver device receives a message such as via messaging application 228, with an attached carrier image.

In block 618, messaging application 228 stores the message on a local storage 250, such as in a user accessible gallery, or in a private database for messaging application 228. Once the image is stored on storage 250, file monitor 516 may detect that a new image has been stored on storage 250. File monitor 516 then examines the image to determine whether it has steganographic content. This may include, for example, inspecting special headers or other data, or simply analyzing the message to see if there is an extractable steganographic message.

When file monitor 516 determines that there is an image, key and policy management 518 brokers authorization with backend 606. This may include receiving authorization for the message to be displayed on the device, receiving appropriate decryption keys, and exchanging information about a policy to be applied to the message.

In block 622, steganographic subsystem 514 applies reverse stenography to the carrier image.

In block 624, encryption subsystem 512 decrypts the message content using, for example, keys provided by backend 606 in block 620.

In block 626, the recipient device displays the message content via a visualizer service. This may be in some examples embedded in security aware keyboard 504. This ensures that the display is not tampered with by other systems. Particularly, security aware keyboard 504 may be provided via TEE 400, in which case, other system services do not have access to it. Thus, in block 626, the policy for the message may be enforced.

In block 628, key and policy management 518 executes any message policy actions attached to the message. For example, the policy may specify that the message is to be destroyed 5 minutes after the user first views it, or at a time certain, by way of nonlimiting example. Other restrictions, such as on forwarding the message or taking screenshots may also be enforced.

In block 699, the method is done.

Figure 7:
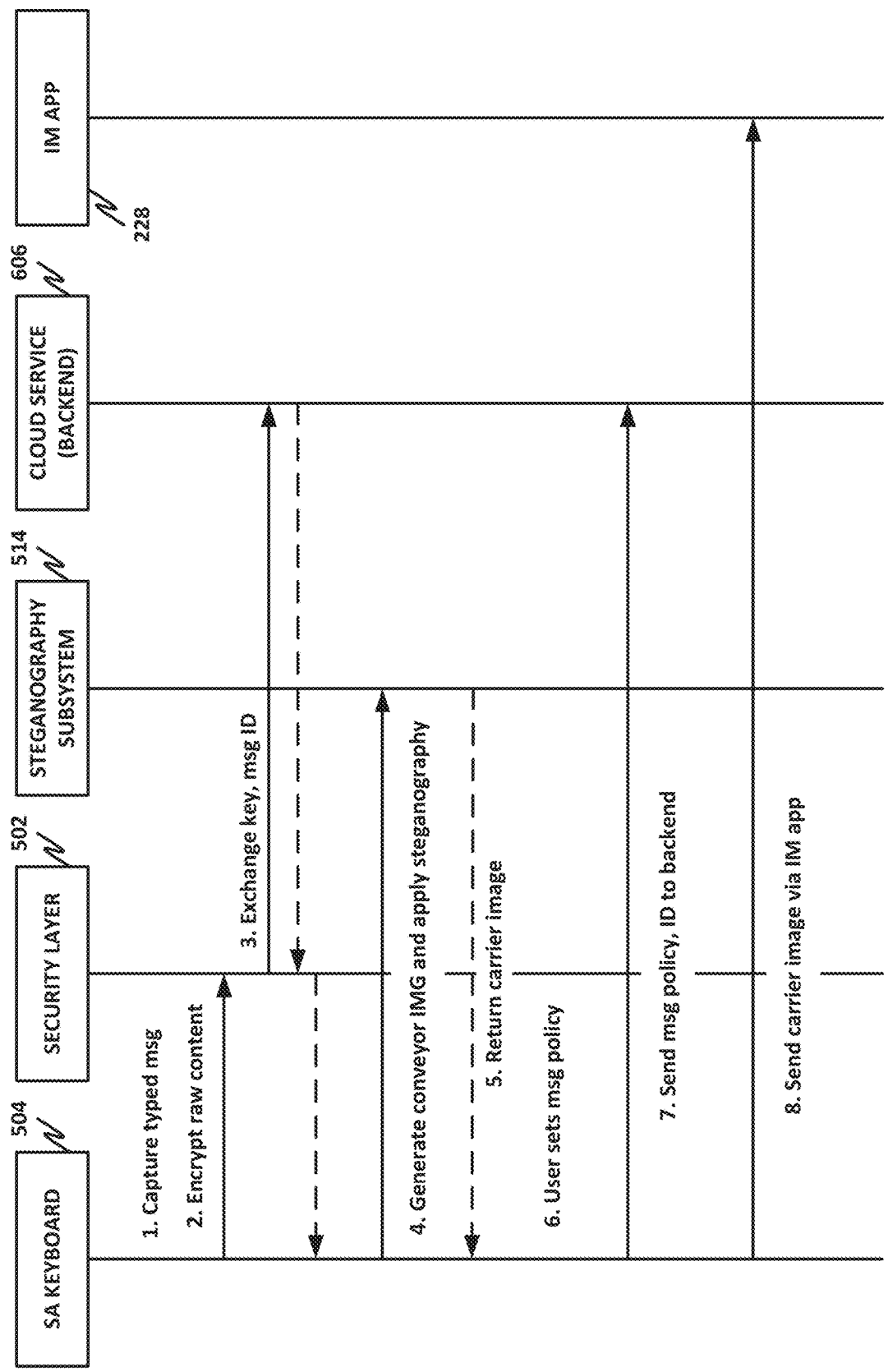
FIG. 7 is a sender-side signal flow diagram according to one or more examples of the present specification.
Figure 8:
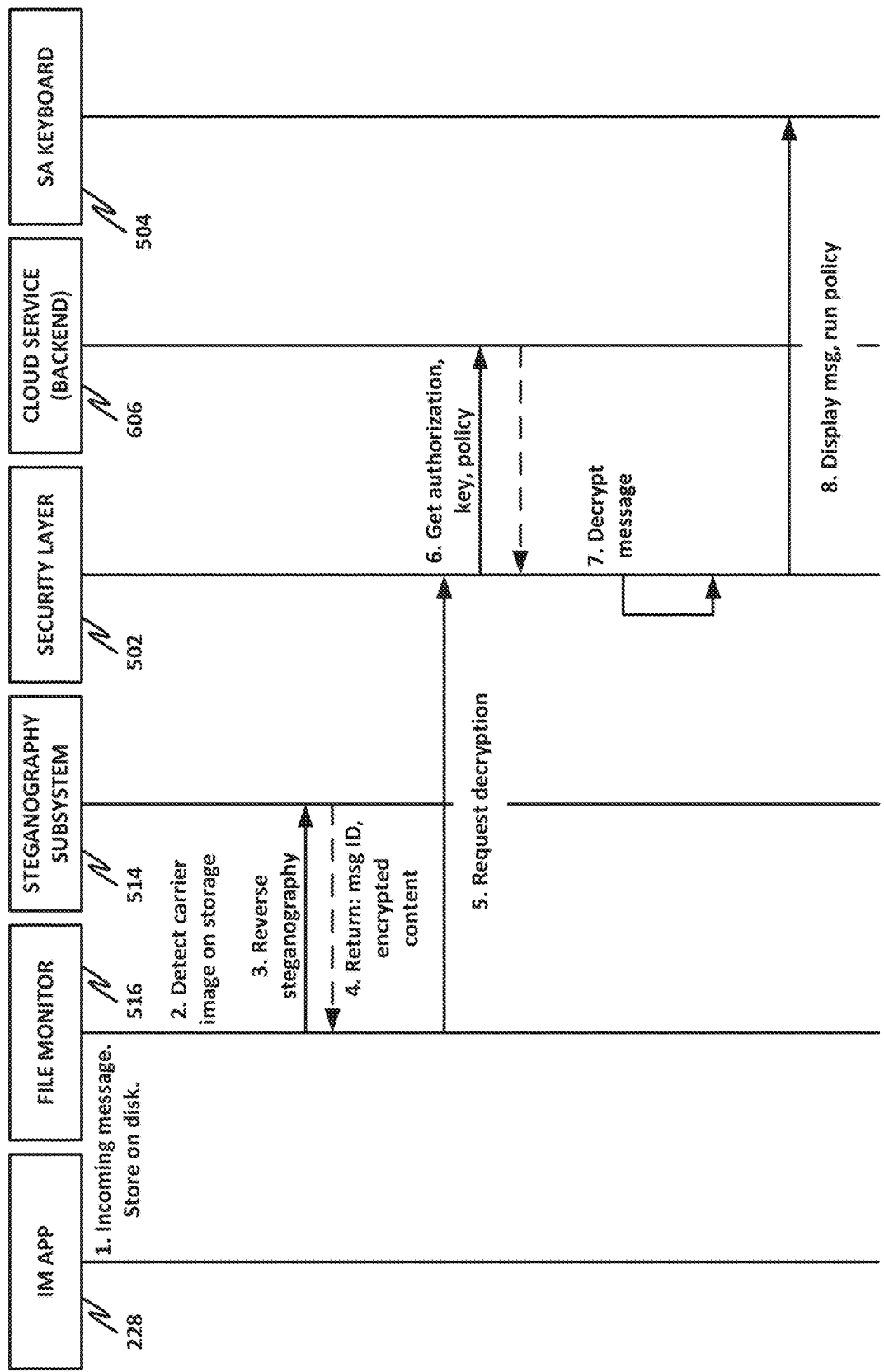
FIG. 8 is a receiver-side signal flow diagram according to one or more examples of the present specification.

FIGS. 7 and 8 together illustrate the end-to-end flow between sender and receiver in an example of the present specification. As described before, sender and receiver sides may run different processes according to the role being played, although both "roles" could be provided by the same, possibly identical application installed on two different devices.

In FIG. 7, at 1, security aware keyboard 504 captures a typed message provided by the operator.

At 2, security aware keyboard 504 provides the content to security layer 502, which encrypts the raw content into in the encrypted message.

At 3, security layer 502 negotiates with backend 606 to exchange keys and negotiate a message ID. This policy may be embedded within the content, which may then be returned to security aware keyboard 504, or other parts of security layer 504.

At 4, the encrypted message is provided to steganography subsystem 514, which applies stenography to embed the message within a carrier image.

At 5, steganography subsystem 514 returns the carrier image to security aware keyboard 504.

At 6, the user may set a message policy for the message, which may be embedded within the message.

At 7, security aware keyboard 504 sends the message policy and ID to backend 606.

At 8, security aware keyboard 504 sends the carrier image to messaging application 228 so that messaging application 228 can send the carrier image as an attachment.

In FIG. 8, at 1 messaging application 228 receives an incoming message and stores it on storage 250.

At 2, file monitor 516 detects the carrier image on storage 250.

At 3, file monitor 516 provides the carrier image to stenography subsystem 514, which reverses the steganography.

At 4, stenography subsystem 514 returns the message ID and the encrypted content to file monitor 516.

At 5, file monitor 516 requests a decryption via security layer 502.

At 6, security layer 502 gets the authorization, key, and policy from backend 606.

At 7, security layer 502 decrypts the message.

At 8, the decrypted message and policy data are provided to security aware keyboard 504, which can display the method.

Figure 9:
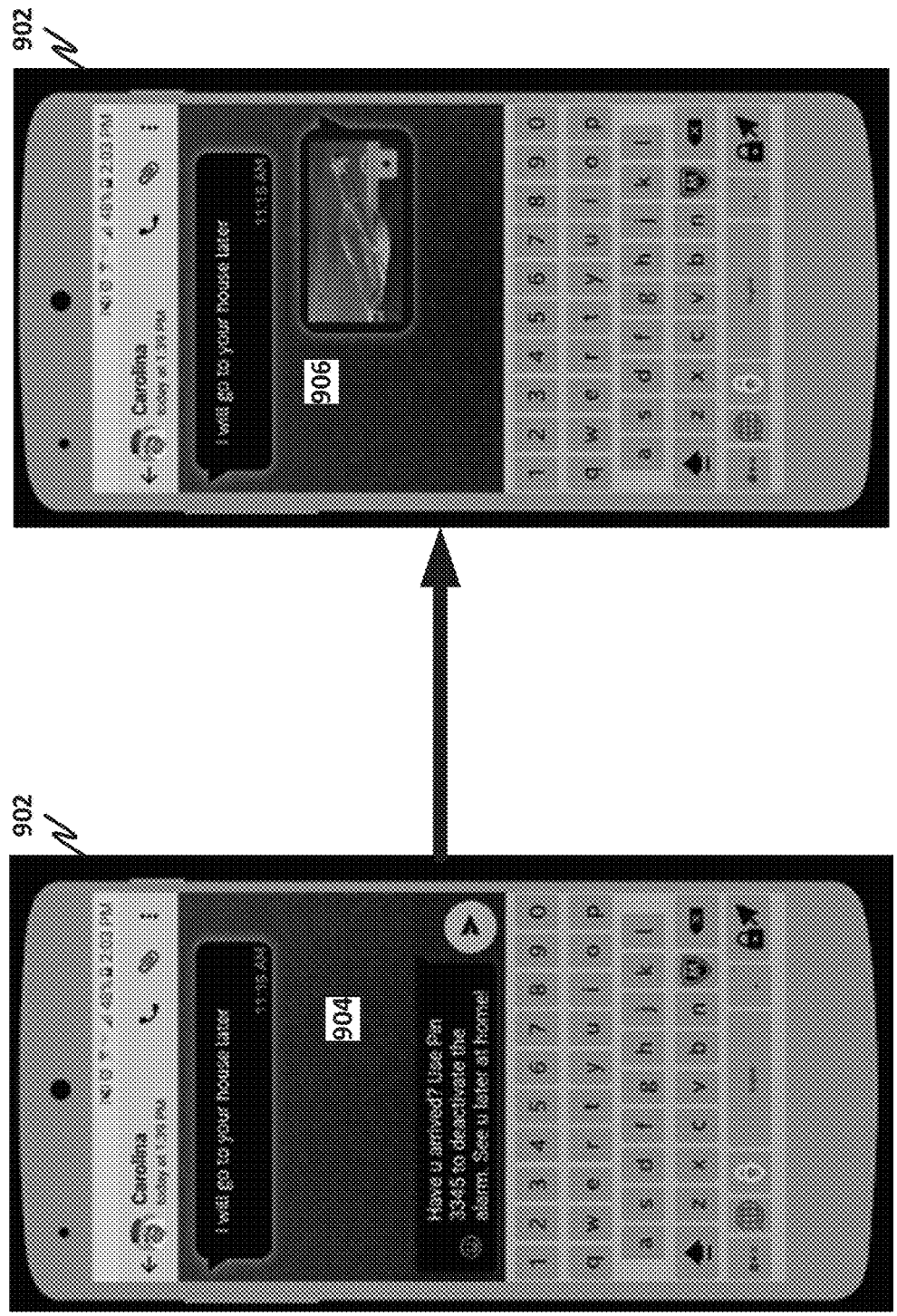
FIG. 9 is an illustration of sending a message according to one or more examples of the present specification.
Figure 10:
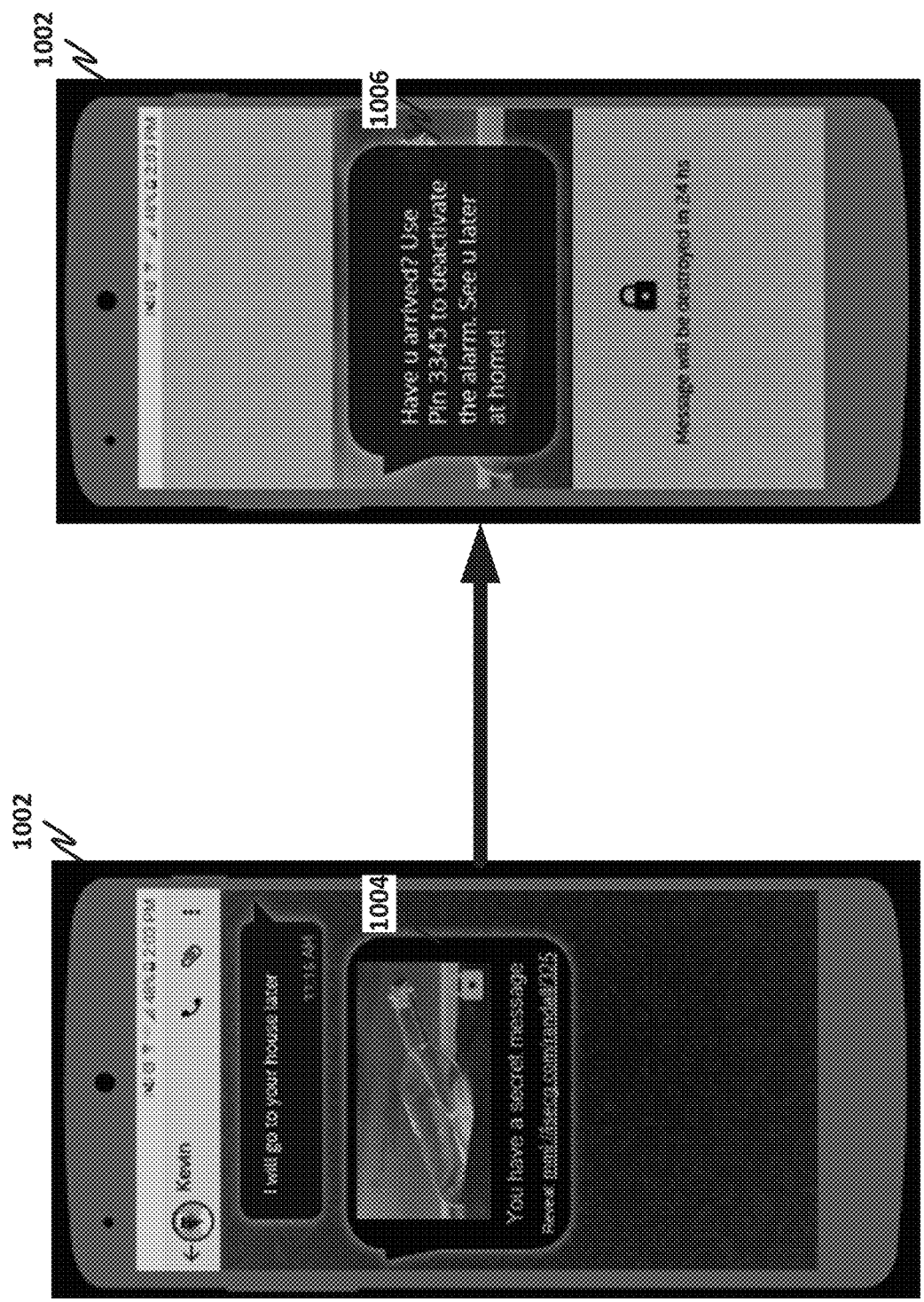
FIG. 10 is an illustration of sending a message according to one or more examples of the present specification.

Turning to FIGS. 9 and 10, there is illustrated an example user experience of message protection in an instant messaging application. In FIG. 9, user Kevin operates mobile device 902 and has heard from Carolina, "I will go to your house later." Kevin wants to use mobile device 902 to send the sensitive and non-grammatical message 904 "Have u arrived? Use Pin 3345 to deactivate the alarm. See u later at home!" Kevin uses security aware keyboard 504 to compose and send this message.

Security subsystem 502 encrypts the message and embeds it in carrier image 906, and then sends the carrier image to Carolina.

In FIG. 10, Carolina receives a message 1004 from Kevin. The only visible content of this message is carrier image 906. The message also includes the notification, "You have a secret message," along with a hyperlink that will activate decryption for the message.

Security layer 502 may then decrypt the message, and display plain text message 1006, with the original text of sensitive message 904. There is also a policy notification, specifically, that the message will be destroyed in 24 hours. Note that while plain text message 1006 is displayed, certain functions may be disabled, such as screen capture. Also note that a policy may prevent message 1004 from being forwarded or copied.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the Figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the Figures may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the Figures may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the Figures and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

EXAMPLE IMPLEMENTATIONS

There is disclosed in an example, a computing apparatus, comprising: a network interface; a messaging application to communicate via the network interface; and one or more logic elements comprising a security layer, discrete from the messaging application, to: generate a sensitive message; secure the sensitive message; and send the sensitive message via the messaging application.

There is further disclosed an example, wherein the apparatus is a mobile device.

There is further disclosed at least one example, wherein the security layer is further to enforce a policy for the sensitive message.

There is further disclosed at least one example, wherein the security layer is to embed the sensitive message in an image via steganography.

There is further disclosed at least one example, wherein the steganography is compression resistant.

There is further disclosed at least one example, wherein the security layer is to encrypt the sensitive message.

There is further disclosed at least one example, wherein the security layer is to communicate with a backend server to negotiate a security key.

There is further disclosed at least one example, wherein the security layer is to communicate with a backend server to negotiate a policy for the sensitive message.

There is further disclosed at least one example, wherein the policy is a retention policy with a maximum retention period.

There is further disclosed at least one example, wherein the security layer comprises a soft keyboard.

There is further disclosed at least one example, wherein the soft keyboard is a default input method for the apparatus.

There is further disclosed an example of a computing apparatus, comprising: a storage; a network interface; a networking application to communicate via the network interface, and to receive an incoming sensitive message via the network interface, the incoming sensitive message comprising a steganographic image, and store the incoming sensitive message on the storage; and a security layer discrete from the networking application, to: detect the stored steganographic image on the storage; reverse the steganography; and extract a sensitive message.

There is further disclosed at least one example, wherein the security layer is further to decrypt the sensitive message.

There is further disclosed at least one example, wherein the security layer is further to enforce a policy attached to the sensitive message.

There is further disclosed at least one example, wherein enforcing the policy comprises destroying the sensitive message after expiry of a time to live for the sensitive message.

There is further disclosed an example of one or more tangible, non-transitory computer-readable storage mediums having stored thereon executable instructions to provide a security layer, discrete from a messaging application, to: generate a sensitive message; secure the sensitive message; and send the sensitive message via the messaging application, wherein the messaging application is operable to send the sensitive message via a network interface.

There is further disclosed at least one example, wherein the security layer is further to enforce a policy for the sensitive message.

There is further disclosed at least one example, wherein the security layer is to embed the sensitive message in an image via steganography.

There is further disclosed at least one example, wherein the steganography is compression resistant.

There is further disclosed at least one example, wherein the security layer is to encrypt the sensitive message.

There is further disclosed at least one example, wherein the security layer is to communicate with a backend server to negotiate a security key.

There is further disclosed at least one example, wherein the security layer is to communicate with a backend server to negotiate a policy for the sensitive message.

There is further disclosed at least one example, wherein the policy is a retention policy with a maximum retention period.

There is further disclosed at least one example, wherein the security layer comprises a soft keyboard.

There is further disclosed at least one example, wherein the soft keyboard is a default input method for the apparatus.

There is further disclosed an example of one or more tangible, non-transitory computer-readable mediums having stored thereon executable instructions for instructing a processor to: provide a networking application to communicate via a network interface, and to receive an incoming sensitive message via the network interface, the incoming sensitive message comprising a steganographic image, and store the incoming sensitive message on a storage; and provide a security layer discrete from the networking application, to: detect the stored steganographic image on the storage; reverse the steganography; and extract a sensitive message.

There is further disclosed at least one example, wherein the security layer is further to decrypt the sensitive message.

There is further disclosed at least one example, wherein the security layer is further to enforce a policy attached to the sensitive message.

There is further disclosed at least one example, wherein enforcing the policy comprises destroying the sensitive message after expiry of a time to live for the sensitive message.

There is further disclosed an example of a computer-implemented method of providing a security layer, discrete from a messaging application, comprising: generating a sensitive message; securing the sensitive message; and sending the sensitive message via the messaging application, wherein the messaging application is operable to send the sensitive message via a network interface.

There is further disclosed at least one example, further comprising enforcing a policy for the sensitive message.

There is further disclosed at least one example, further comprising embedding the sensitive message in an image via steganography.

There is further disclosed at least one example, wherein the steganography is compression resistant.

There is further disclosed at least one example, further comprising encrypting the sensitive message.

There is further disclosed at least one example, further comprising communicating with a backend server to negotiate a security key.

There is further disclosed at least one example, further comprising communicating with a backend server to negotiate a policy for the sensitive message.

There is further disclosed at least one example, wherein the policy is a retention policy with a maximum retention period.

There is further disclosed at least one example, further comprising providing a soft keyboard.

There is further disclosed at least one example, wherein the soft keyboard is a default input method.

There is further disclosed an example of a computer-implemented method, comprising: providing a networking application to communicate via a network interface, and to receive an incoming sensitive message via the network interface, the incoming sensitive message comprising a steganographic image, and store the incoming sensitive message on a storage; and providing a security layer discrete from the networking application, to: detect the stored steganographic image on the storage; reverse the steganography; and extract a sensitive message.

There is further disclosed at least one example, wherein the security layer is further to decrypt the sensitive message.

There is further disclosed at least one example, wherein the security layer is further to enforce a policy attached to the sensitive message.

There is further disclosed at least one example, wherein enforcing the policy comprises destroying the sensitive message after expiry of a time to live for the sensitive message.

There is further disclosed at least one example of an apparatus comprising means for performing the method.

There is further disclosed at least one example, wherein the means for performing the method comprise a processor and a memory.

There is further disclosed at least one example, wherein the memory comprises machine-readable instructions, that when executed cause the apparatus to perform the method.

There is further disclosed at least one example, wherein the apparatus is a computing system.

There is further disclosed at least one example at least one computer readable medium comprising instructions that, when executed, implement a method or realize an apparatus as described.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

What is claimed is:

1. A computing apparatus, comprising:
a processor and memory;
a network interface;
a messaging application to communicate via the network interface; and
instructions stored on the memory and configured to instruct the processor to provide a security layer comprising a third-party security-aware software keyboard different from an operating system-provided keyboard and discrete from the messaging application, the security layer configured to:
generate a sensitive message from user input to the third-party software keyboard;
secure the sensitive message, comprising encrypting the user input into an encrypted message, and embedding the encrypted message into a dummy conveyor element via steganography; and
send the secured message via the messaging application, comprising sending a multimedia text message with the conveyor element as an attachment, wherein the conveyor element is a digital file, a video file, or a multimedia file.

2. The computing apparatus of claim 1, wherein the apparatus is a mobile device.

3. The computing apparatus of claim 1, wherein the security layer is further to enforce a policy for the secured message.

4. The computing apparatus of claim 1, wherein the steganography is compression resistant.

5. The computing apparatus of claim 1, wherein the security layer is to communicate with a backend server to negotiate a security key.

6. The computing apparatus of claim 1, wherein the security layer is to communicate with a backend server to negotiate a policy for the secured message.

7. The computing apparatus of claim 6, wherein the policy is a retention policy with a maximum retention period.

8. The one or more tangible, non-transitory computer-readable storage mediums of claim 1, wherein the steganography is compression resistant.

9. The computing apparatus of claim 1, wherein the security aware keyboard is a default input method for the apparatus.

10. A computing apparatus, comprising:
a storage;
a processor and memory;
a network interface;
a networking application to communicate via the network interface; and
instructions stored on the storage and configured to instruct the processor to provide a security layer comprising a third-party security-aware software keyboard different from an operating system-provided keyboard and discrete from the networking application, the security layer configured to:

receive an incoming sensitive message via the network interface, the incoming sensitive message comprising a steganographic image, wherein the steganographic image comprises an encrypted message from user input to the third-party software keyboard;

secure the sensitive message, comprising storing the encrypted message from user input on the storage, and embedding the encrypted message into a dummy conveyor element via steganography, wherein the conveyor element is embedded into a multimedia text message with the conveyor element as an attachment, wherein the conveyor element is a digital file, a video file, or a multimedia file;

detect the stored encrypted message on the storage;

reverse the steganography; and decrypt the encrypted message.

11. The computing apparatus of claim 10, wherein the security layer is further to enforce a policy attached to the sensitive message.

12. The computing apparatus of claim 11, wherein enforcing the policy comprises destroying the sensitive message after expiry of a time to live for the sensitive message.

13. One or more tangible, non-transitory computer-readable storage mediums having stored thereon executable instructions to provide a security layer comprising a third-party security-aware software keyboard different from an operating system-provided keyboard and discrete from a messaging application, the security layer configured to:

generate a sensitive message from user input to the third-party software keyboard;

secure the sensitive message, comprising encrypting the user input into an encrypted message, and embedding the encrypted message into a dummy conveyor element via steganography; and send the secured message via the messaging application, comprising sending a multimedia text message with the conveyor element as an attachment, wherein the conveyor element is a digital file, a video file, or a multimedia file, wherein the messaging application is operable to send the sensitive message via a network interface.

14. The one or more tangible, non-transitory computer-readable storage mediums of claim 13, wherein the security layer is further to enforce a policy for the secured message.

15. The one or more tangible, non-transitory computer-readable storage mediums of claim 13, wherein the security layer is to communicate with a backend server to negotiate a security key.

16. The one or more tangible, non-transitory computer-readable storage mediums of claim 13, wherein the security layer is to communicate with a backend server to negotiate a policy for the secured message.

17. The one or more tangible, non-transitory computer-readable storage mediums of claim 16, wherein the policy is a retention policy with a maximum retention period.

18. The one or more tangible, non-transitory computer-readable storage mediums of claim 13, wherein the security aware keyboard is a default input method for an apparatus.

\* \* \* \* \*

UNITED STATES PATENT AND TRADEMARK OFFICE
CERTIFICATE OF CORRECTION

PATENT NO. : 10,652,218 B2
APPLICATION NO. : 15/392003
DATED : May 12, 2020
INVENTOR(S) : German Lancioni et al.

Page 1 of 1

It is certified that error appears in the above-identified patent and that said Letters Patent is hereby corrected as shown below:

In the Claims

In Column 24, Line 50, in Claim 8, delete "one or more tangible, non-transitory computer-readable storage mediums" and insert -- computing apparatus --, therefor.

Signed and Sealed this
Twenty-third Day of June, 2020

Andrei Iancu
*Director of the United States Patent and Trademark Office*